(12) United States Patent
Piercey et al.

(10) Patent No.: US 8,664,819 B2
(45) Date of Patent: Mar. 4, 2014

(54) METHOD AND APPARATUS FOR PERMANENT MAGNET ATTACHMENT IN AN ELECTROMECHANICAL MACHINE

(75) Inventors: Mark S. Piercey, Sudbury, MA (US); Peter P. Mongeau, Westborough, MA (US); Jonathan A. Lynch, St. Johnsbury, VT (US); Thomas D. Kohler, Westport, NY (US); Paul A. Smith, Montpelier, VT (US)

(73) Assignee: Northern Power Systems Utility Scale, Inc., Barre, VT (US)

(*) Notice: Subject to any disclaimer, the term of this patent is extended or adjusted under 35 U.S.C. 154(b) by 138 days.

(21) Appl. No.: 12/543,153

(22) Filed: Aug. 18, 2009

(65) Prior Publication Data

US 2011/0043065 A1 Feb. 24, 2011

(51) Int. Cl.
*H02K 21/12* (2006.01)
*H02K 1/18* (2006.01)

(52) U.S. Cl.
USPC ............ 310/156.12; 310/156.16; 310/156.22; 310/156.28; 29/598

(58) Field of Classification Search
USPC ............ 310/156.08, 156.12, 156.28, 156.09, 310/156.16, 156.22, 156.11, 156.19; 290/55; 29/598
See application file for complete search history.

(56) References Cited

U.S. PATENT DOCUMENTS

| | | | |
|---|---|---|---|
| 6,481,090 B1 * | 11/2002 | Franco et al. | 29/598 |
| 6,492,755 B1 * | 12/2002 | Jones | 310/156.12 |
| 7,042,109 B2 * | 5/2006 | Gabrys | 290/44 |
| 7,473,087 B2 | 1/2009 | Steiner | |
| 7,573,168 B2 * | 8/2009 | Carl et al. | 310/156.08 |
| 2003/0080640 A1 * | 5/2003 | Weiglhofer et al. | 310/156.12 |
| 2004/0150281 A1 * | 8/2004 | Malmberg | 310/156.28 |
| 2006/0040010 A1 * | 2/2006 | Steiner | 425/192 R |
| 2007/0290564 A1 * | 12/2007 | Clark | 310/156.29 |
| 2008/0048517 A1 | 2/2008 | Ochiai et al. | |
| 2008/0150385 A1 * | 6/2008 | Silander | 310/156.28 |

FOREIGN PATENT DOCUMENTS

| | | |
|---|---|---|
| JP | 61121748 | 6/1986 |
| JP | 7274419 | 10/1995 |
| JP | 08223835 A * | 8/1996 |
| JP | 09322446 A * | 12/1997 |
| JP | 2000116038 A * | 4/2000 |
| JP | 2003333774 | 11/2003 |
| JP | 20044023864 | 1/2004 |
| JP | 2007236160 A * | 9/2007 |

OTHER PUBLICATIONS

Machine Translation JP2000116038 (2000).*
Merriam Webster's Collegiate dictionary 10 edition (1993).*

(Continued)

*Primary Examiner* — Tran Nguyen
*Assistant Examiner* — Jose Gonzalez Quinones
(74) *Attorney, Agent, or Firm* — Downs Rachlin Martin PLLC

(57) ABSTRACT

An apparatus and method for the installation and removal of permanent magnets in a permanent magnet electromechanical machine, for example a wind turbine power unit generator. A magnet holder is mounted on a magnet carrying structure such as a rotor. Permanent magnets may be inserted into and removed from the magnet holder after the electromechanical machine is assembled. In this manner, permanent magnets may be installed on the magnet carrying structure by an interference fit, without using bolts or adhesives, to facilitate both assembly and removal for maintenance and repair.

41 Claims, 6 Drawing Sheets

(56) References Cited

OTHER PUBLICATIONS

Related PCT International Patent Application No. PCT/US2010/045836 filed Aug. 18, 2010.

International Search Report and Written Opinion dated Oct. 20, 2010, in related International Application No. PCT/US2010/045836 filed Aug. 18, 2010.

\* cited by examiner

METHOD AND APPARATUS FOR PERMANENT MAGNET ATTACHMENT IN AN ELECTROMECHANICAL MACHINE

TECHNICAL FIELD

The present invention generally relates to the field of permanent magnet machines, for example, wind power generators. In particular, electromechanical embodiments of the present invention are directed to a holder for installing and containing permanent magnets within the rotor structure of a permanent magnet motor or generator.

BACKGROUND

Permanent magnet ("PM") electromechanical machines utilize permanent magnets to convert rotational inputs into electricity or electrical inputs into rotational motion. One example is wind power units ("WPUs") that generate electricity from the energy in wind. Generally, a PM generator or motor has three components. A first component, a stator, is a cylindrical housing that contains electrical windings that remain immobile during electricity generation. A second component, a rotor, is a rotatable assembly containing permanent magnets that spin with respect to the stator. The relative movement between the rotor and the stator produces a moving magnetic field, which induces an electrical current in the stator electrical windings, thereby producing electricity. A third component, such as an axle, rotationally supports the rotor with respect to the stator, enabling the two to rotate relative to each other.

As with other electromechanical machines that use permanent magnets, the permanent magnets in WPUs are typically installed relatively early in the assembly process. While it may be convenient to install magnets early in the assembly process, the presence of high strength permanent magnets can make later stages of assembly and installation inconvenient and dangerous. This situation arises because subsequent assembly and installation steps require use of, and transportation near, ferromagnetic materials which are strongly attracted to the permanent magnets. Further, the process of assembling the stator and the rotor can be more difficult because of the tight spacing at the machine airgap, and the high magnetic forces between the rotor and the stator. Such assembly of magnets can especially complicate field repair and service of WPUs due to remote locations and positioning at the top of high towers.

Permanent magnets are often fastened within PM machines using bolts or other similar mechanical means directly secured to the magnets. While bolting the magnet to the rotor does securely fasten the magnet, bolting also makes removal of the magnet during maintenance difficult by, for example, requiring disassembly of the generator in order to remove the bolts. Directly bolting the magnets may also remove magnetic material. Removal of magnetic material can change the magnetic flux characteristics, thereby altering electricity generation. Furthermore, removing magnetic material and using bolts risks damaging the magnet during generator assembly or maintenance because of the stresses exerted on the magnet. These factors increase the effort and expense required to maintain a PM electromechanical machine, especially a WPU located in the field.

SUMMARY OF THE DISCLOSURE

Exemplary embodiments of the present invention include methods, systems, and apparatus for securing magnets within a PM electromechanical machine, and assembling a generator, including securing the permanent magnet within the generator assembly after it is otherwise completed. When a magnet is secured according to embodiments of the present invention, the magnet can be removed and replaced as needed, thereby simplifying maintenance. In one exemplary embodiment, a magnet holder mounted in a PM machine is configured and dimensioned in combination with a magnet mounting surface and the magnet to produce an interference fit with the magnet.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

As will be seen, the exemplary embodiments of methods, systems, and apparatus implementing the present disclosure are varied in terms of where and how permanent magnets may be inserted into an electromechanical machine after the machine has been assembled. While a number of particular examples are presented below to illustrate the breadth of the disclosure, those skilled in the art will appreciate the large number of variations.

Figure 1A:
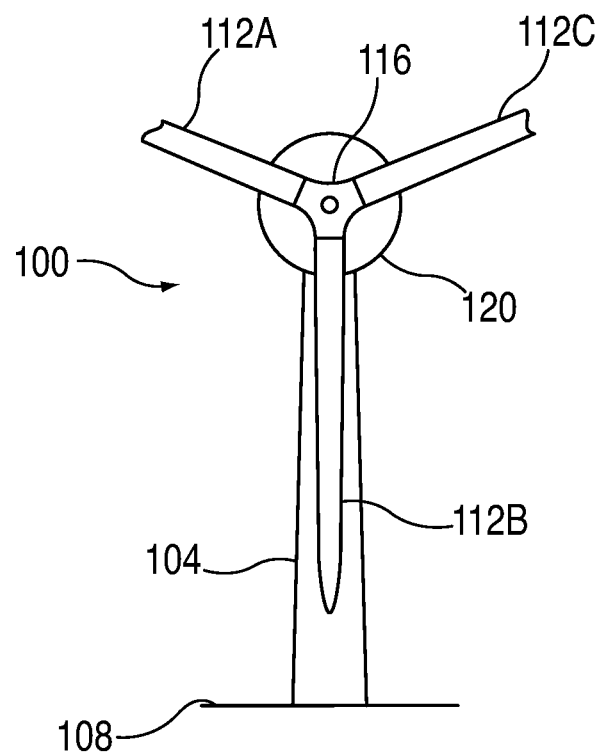
FIG. 1A is a front elevational view of a WPU.
Figure 1B:
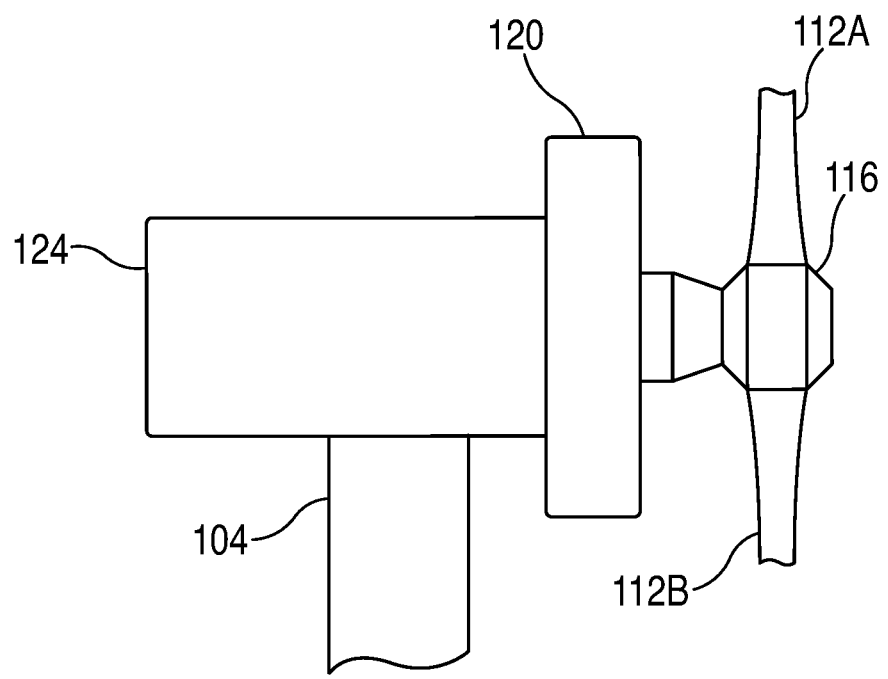
FIG. 1B is a side elevational view of a WPU.

For illustration purposes only, embodiments of the invention are described herein with reference to WPU embodiments. As depicted in FIGS. 1A and 1B, WPU 100 has a tower 104 supported by a surface 108, three airfoils ("blades") 112A-C connected to a hub 116, a generator 120, and a nacelle 124. Tower 104 elevates blades 112A-C to a sufficient height above surface 108 to access wind currents that are both sufficiently strong and persistent so as to turn the blades for production of electricity. While the example depicted in FIGS. 1A and 1B has three blades, other designs may have additional blades or fewer blades. Electricity is produced by connecting a rotor to the blades via a hub and a rotational support structure, such as an axle, and enabling relative rotation between the rotor and the stator.

Figure 2A:
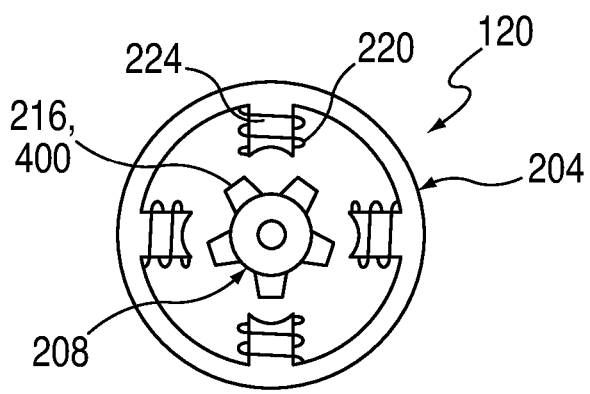
FIG. 2A is a schematic cross-sectional view of a generator, as can be used in a WPU.
Figure 2B:
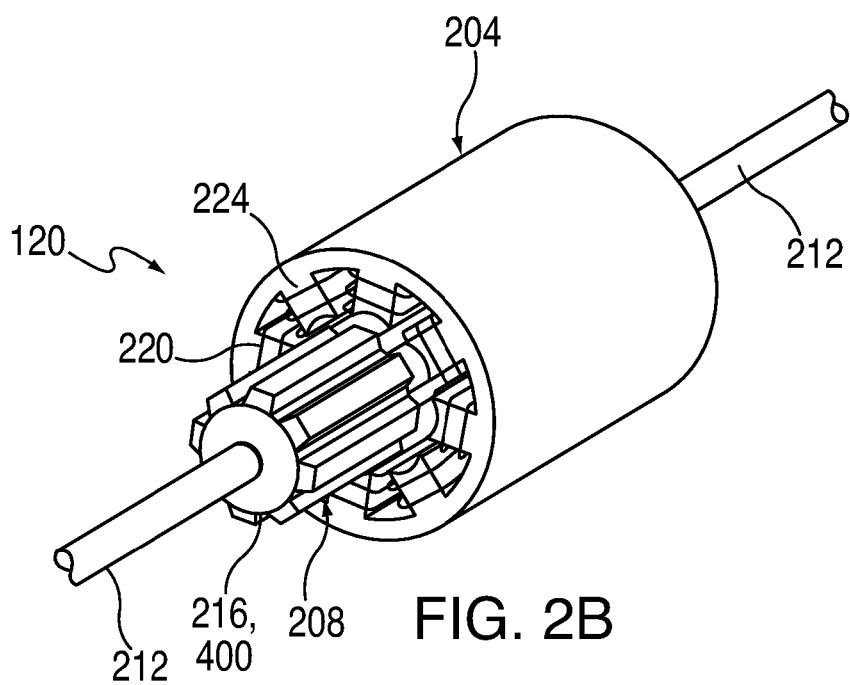
FIG. 2B is a schematic view of a generator, as can be used in a WPU.

As shown in FIGS. 2A and 2B, an exemplary generator 120 includes rotor 208 disposed within stator 204. Other examples not shown may dispose the stator within the rotor. Magnets are mounted on a magnet carrying structure such as the rotor or stator depending on the particular design. In the presently illustrated embodiment, permanent magnets 216 are mounted on the surface of rotor 208 via holders 400 (described below). Rotor 208 rotates with a rotation support structure, in this example axle 212. Electrical windings 220 are attached to cores 224 that are arranged around the inner circumference of stator 204. As discussed previously, the force exerted on blades 112A-C by the wind rotates hub 116 and, in this example, axle 212. As axle 212 turns, it rotates rotor 208. The rotating permanent magnets 216 disposed on rotating rotor 208 induce a current in the surrounding electrical windings 220. The rotating magnets must be securely fastened to the rotor.

Figure 3A:
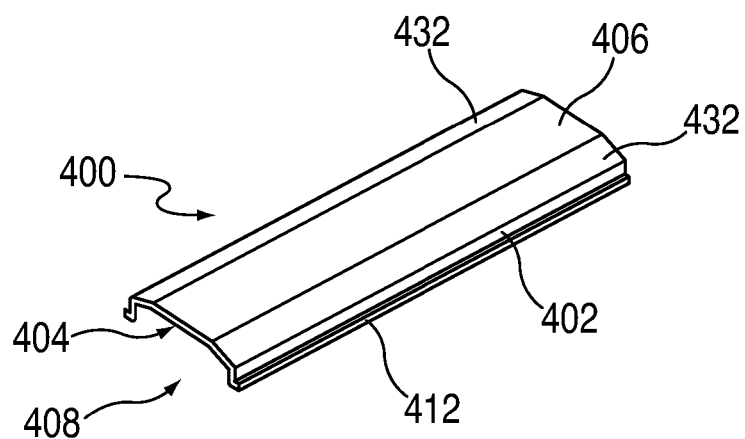
FIG. 3A is an isometric view of a magnet holder.

According to embodiments of the present invention, magnet holders are used to secure the magnets via an interference fit. The interference fit into the magnet holder provides a biasing force to secure the magnet within the holder. In one exemplary embodiment of the present invention as illustrated in FIG. 3A, magnet holder 400 has longitudinally extending sides 402 joined by a closed top 406 to define an open bottom 404 and opposed open ends 408. Alternatively, one end of magnet holder 404 may be closed. Edge flanges 412 may be formed along the lower edge of each side 402 to facilitate mounting of the holders as described below. Magnet holder 400 may be made from austenitic stainless steel or any non-ferromagnetic material, such as ceramic, plastic, fiberglass, or other composite material.

Figure 3B:
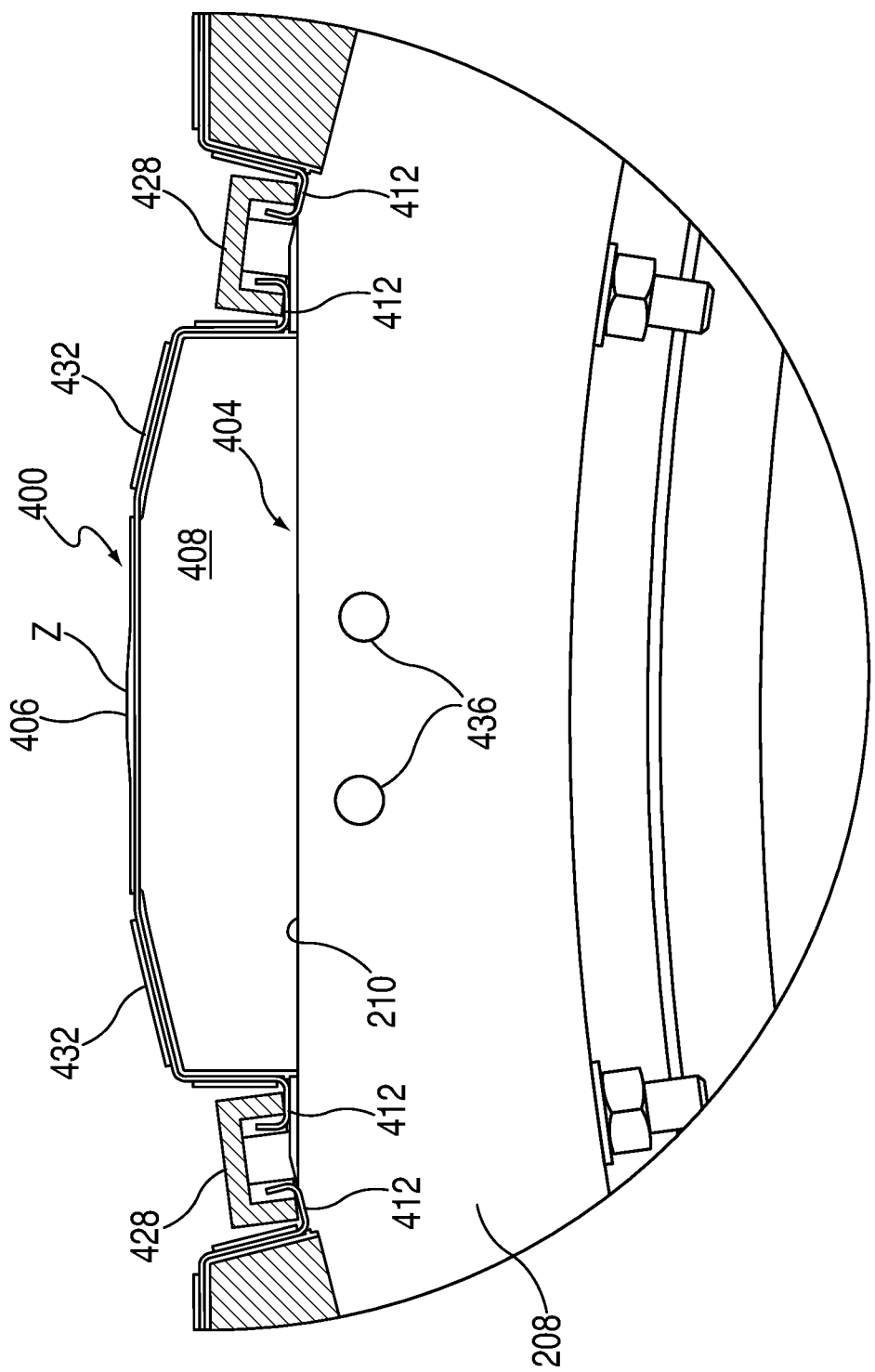
FIG. 3B is an end view of a magnet holder mounted on a rotor.
Figure 3C:
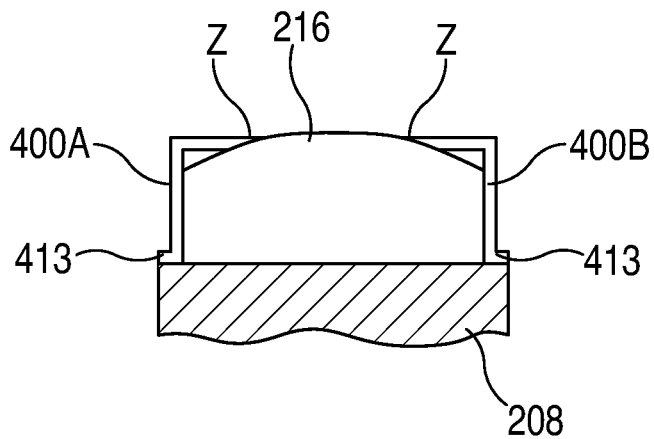
FIG. 3C is a schematic cross-sectional view of an alternative embodiment of magnet holder.
Figure 3D:
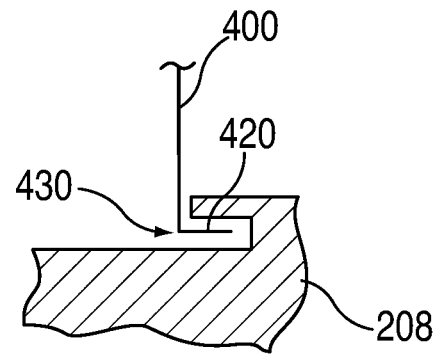
FIG. 3D is a partial detail view of an alternative embodiment for mounting a magnet holder.

As shown in FIG. 3B, a series of holders 400 may be mounted on rotor 208 using U-shaped clamping bars 428 bolted down against edge flanges 412. Other suitable securing means, such as welding sides 402 directly to the rotor, may be used. In yet other examples, a tab 420 on holder 400 may be inserted into a slot 430 on the rotor 208 to secure the holder as shown in FIG. 3D. The dimensions of holder 400, selected in combination with its mounting height on rotor 208, are designed to cause an interference fit between permanent magnet 216, the magnet holder, and the rotor. Thus, in an exemplary embodiment, the distance between rotor surface 210 and closed top 406 is less than the cross-sectional height of permanent magnet. An illustrative example provided below describes one possible set of dimensions to provide such an interference fit. Other suitable dimensions may be determined by persons skilled in the art based on the teachings herein. Optional longitudinal facets 432 formed in top 406 facilitate flexing of magnet holder 400, to ease insertion of the magnets while maintaining a secure interference fit.

Figure 4:
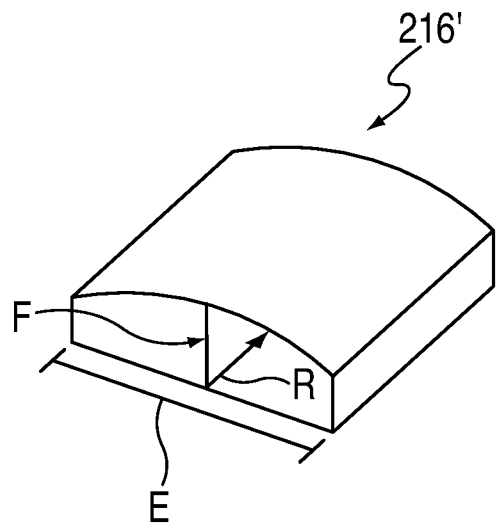
FIG. 4 is an isometric view of a permanent magnet section.

Permanent magnets 216 as mounted on rotor 208 may be divided into sections 216' for ease of installation and handling. FIG. 4 illustrates such an exemplary embodiment. Permanent magnet section 216' may be a Neodymium alloy permanent magnet. Other embodiments can be made from any suitable magnetic material including iron, iron alloys, and rare-earth element alloys. The magnet shape may be designed to, among other things, optimize electricity generation by tailoring the magnetic flux density exposed to the stator windings. The magnet shape may also be suitable for insertion into magnet holder 400 through access door 304 in stator back plate 308 (see FIG. 6) for maintenance and repair in the field after initial assembly. Because of the need to assure an interference fit, the magnet and magnet holder typically would be designed in conjunction with each other. In this exemplary embodiment, permanent magnet section 216' has a square plan-view perimeter of width E, and a convex top surface having height F and radius R. Other exemplary embodiments of permanent magnet section 216' cross-section and plan view perimeters include square, rectangular, trapezoidal, elliptical plan-view perimeters, and magnets with radiused or chamfered edges.

In one non-limiting example, with reference to FIGS. 3B and 4, the combination of magnet and magnet holder may have the following dimensions: The magnet height may be approximately 21 mm, while the inside magnet cover height may be approximately 18.5 mm. In this example, the surface on which magnet sections 216' are seated is approximately 1 mm higher than the adjacent channels in the rotor surface where edge flanges 412 are seated. With this arrangement, an interference is created at point Z (FIG. 43B) with line to line contact between the magnet and the holder. The interference may be about 1 mm. The amount of interference is preferably selected so that deformation of magnet holders 400 remains in an elastic deformation regime to facilitate removal and replacement of magnet sections 216' for maintenance and repair. In another exemplary embodiment, the interference between the magnet and magnet holder is between about 0.5 and 1.7 mm.

As will be apparent to those of skill in the art, other arrangements of dimensions and interference fits between the magnet holders 400 and magnet sections 216' may be selected based on the teachings contained herein without departing from the scope of the present invention. For example, rather than having a closed top, the magnet holder may be formed with an open top, in other words essentially as two inverted L-shaped sides 400A, 400B with inwardly directed flanges separated by a gap defining a top surface. These inwardly directed flanges maintain the magnets by interference along the base of each inverted L (at points Z) as shown in FIG. 3C. Also in FIG. 3C, sides 400A and 400B are welded directly to rotor 208 along bottom edge welds 413. In another alternative, rather than individual, separate holders secured at each magnet location, a single-piece holder may be formed with bent sides and tops that extends around entire rotor 208. This embodiment could appear essentially as shown in FIG. 3B except that the separate holders would be integrally joined in the area of flanges 412.

Figure 5:
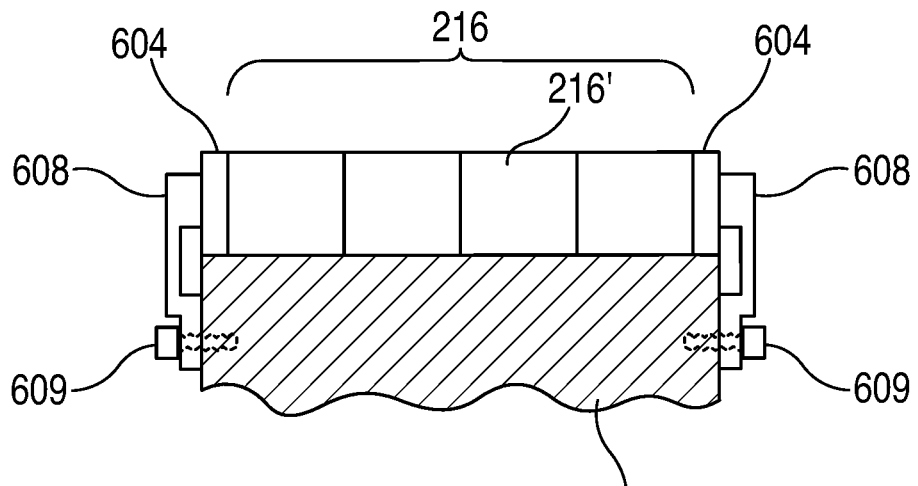
FIG. 5 is a partial cross-sectional view of permanent magnet sections disposed within a magnet holder on a rotor surface.

FIG. 5 illustrates an exemplary arrangement of magnet sections 216' on rotor 208 as inserted into a magnet holder, but with the holder omitted for clarity. In this embodiment, four magnet sections 216' are disposed within each magnet holder 400, however the number of magnet sections may be more or less than four depending on the design of generator 120, magnet 216, and magnet holder 400. This exemplary embodiment also illustrates the use of end-caps 604 and end flanges 608. A first end-cap 604 is installed preceding insertion of a first magnet section 216'. A second end-cap 604 is inserted into the holder after the insertion of the last magnet section 216'. End-caps 604 space and protect the magnet sections from end flanges 608 that are bolted to rotor 208 via bolts 609 and bolt holes 436 (shown in FIG. 4B). In other embodiments, a first end-cap 604 may be integrated into magnet holder 400 or on rotor 208 so as to remove the need to insert the first end-cap with magnet sections 216'.

Figure 6:
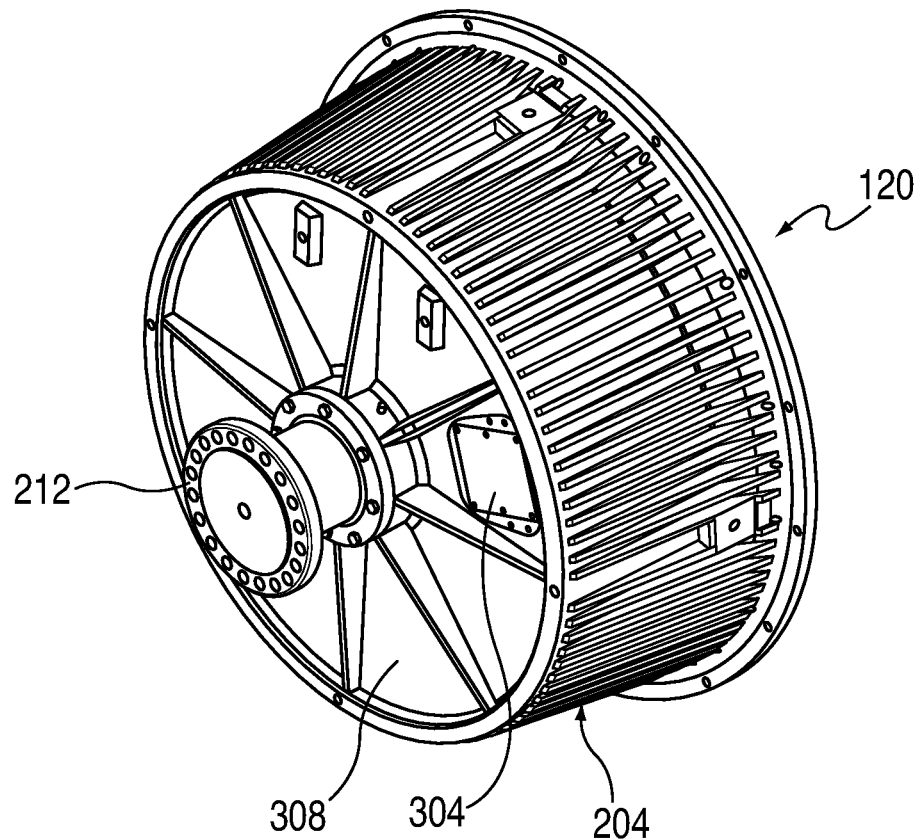
FIG. 6 is an isometric view of a WPU generator assembly.
Figure 7:
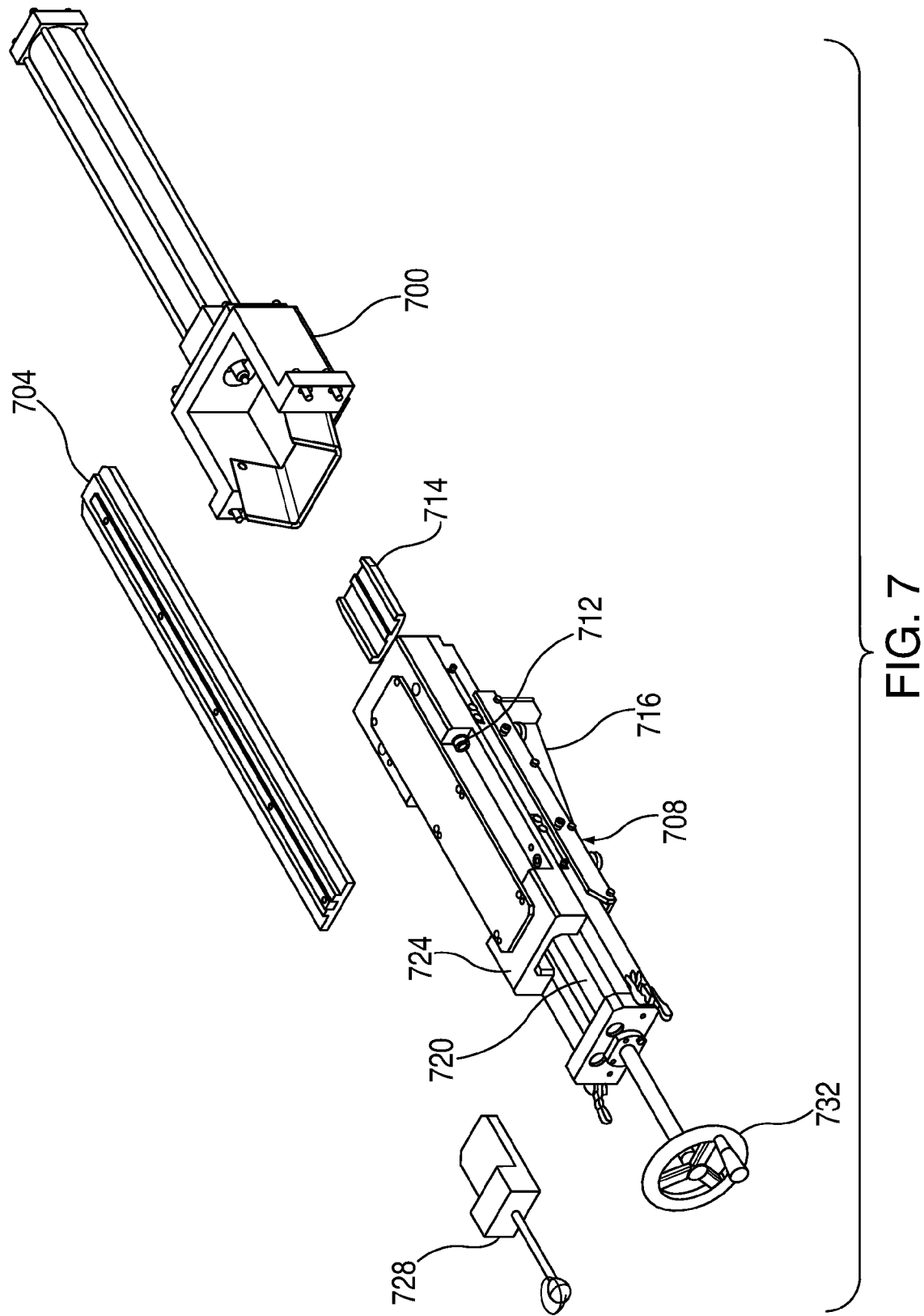
FIG. 7 is an isometric view of components used to insert magnets into an assembled WPU generator through a magnet access door.

An exemplary embodiment of a method for inserting magnets into an electromechanical machine such as a WPU generator according to the present invention will now be described in connection with FIGS. 6 and 7. As shown in FIG. 6, in an assembled generator 120, rotor 208 (not visible) is nested within stator 204 with axle 212 passing through both the rotor and the stator. The back of stator 204 is closed by a back plate 308, while the opposite, front is open. An access door 304 is provided in stator back plate 308. As a preliminary step to insertion, back force assembly 700 is connected to magnet access door 304 in stator back plate 308. Back force assembly 700 extends through magnet access door 304 and helps support the magnet holder during the initial insertion process. On the opposite side of generator 120, the face of rotor 208 is open to expose one end of magnet holders 400 (as shown in FIG. 4B) for insertion of magnets 216. An exemplary insertion process begins first by inserting alignment plate assembly 704 into magnet holder 400 on the side opposing back force assembly 700 in order to confirm alignment. After alignment has been confirmed, alignment plate assembly 704 is withdrawn and load tray assembly 708 is connected to rotor 208. Load tray assembly 708 is attached to rotor 208 using screws 712. Loader support assembly 716, also secured to rotor 208, is mounted adjacent to magnet holder 400 to be filled. If desired, nose block tool 714 can be pushed into magnet holder 400 using pushing tool 728 in order to open the magnet holder to facilitate insertion of magnets, for example by reducing the need for a chamfered end on the magnets. Once load tray assembly 708 is stabilized, first end-cap 604 is inserted into loading channel 720 followed by magnet sections 216'. Magnet sections 216' are pushed under load tray cover 724 using pushing tool 728. A second end-cap 604 is placed into loading channel 720 after last magnet section 216' has been placed into the loading channel. Pushing tool 728 is then placed into loading channel 720 and connected to screw drive 732. Screw drive 732 is then used to push magnet sections 216'and end-caps 604 into magnet holder 400. Insertion of magnet sections 216' and end-caps 604 is complete when first end cap 604 contacts first end flange 608 connected to rotor 208, the end flange acting as a stop. After insertion is completed with contact to first end flange 608, a second end flange 608 is mounted to rotor 208 at the opposite end of the rotor. While load tray assembly 708 uses a screw drive 732 to advance magnet sections 216' and end caps 604, the magnets and end-caps could also be advanced by a motor driven actuator, a pneumatically driven actuator, or a hydraulically driven actuator. After magnets 216 are installed, door 304 can later be used for access to the magnets during maintenance procedures.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for mounting permanent magnets in an electromechanical machine, comprising:
   mounting a magnet holder onto a magnet carrying structure, the magnet holder having a top portion and sides with an open first end;
   sizing the magnet holder in combination with the magnet to provide an interference fit between the magnet holder, a magnet, and the magnet carrying structure, with line-to-line contact between the magnet holder top portion and the magnet;
   sliding the magnet into the holder through the first open end; and
   securing the magnet with said holder by said interference fit between the magnet carrying structure, the magnet, and the magnet holder.

2. The method of claim 1, wherein said mounting comprises welding the magnet holder to the magnet carrying structure.

3. The method of claim 1, wherein said mounting comprises bolting the magnet holder to the magnet carrying structure.

4. The method of claim 1, wherein said mounting comprises clamping the magnet holder to the magnet carrying structure.

5. The method of claim 1, wherein said mounting comprises mounting the magnet holder to the magnet carrying structure within slots in the magnet carrying structure.

6. The method of claim 1, wherein the magnet carrying structure comprises a rotor.

7. The method of claim 6, wherein the electromechanical machine comprises a wind power unit.

8. The method of claim 7, wherein said wind power unit is mounted on a tower and said sliding and securing steps are performed on said tower.

9. The method of claim 1, wherein said sliding comprises securing a loading fixture to the rotor, placing a magnet into the loading fixture, and forcing the magnet into the magnet holder from said loading fixture.

10. The method of claim 9, wherein the loading fixture comprises a screw-driven plunger to force the magnet into the magnet holder.

11. The method of claim 9, wherein the loading fixture comprises a hydraulically driven plunger to force the magnet into the magnet holder.

12. The method of claim 9, wherein the loading fixture comprises a pneumatically driven plunger to force the magnet into the magnet holder.

13. The method of claim 9, wherein the loading fixture comprises an electrically driven plunger to force the magnet into the magnet holder.

14. The method of claim 9, wherein said sliding further comprises aligning the loading fixture with the magnet holder prior to said forcing.

15. The method of claim 1, wherein the magnets are provided in magnet sections and said sliding comprises advancing plural magnet sections into the magnet holder.

16. The method of claim 1, wherein the magnet holder has an open second end, said method further comprising removing the magnets through the magnet holder open second end for maintenance or replacement.

17. A magnet holder for securing permanent magnets to a magnet mounting surface in an electromechanical machine, wherein the magnets have a height, width and length, said magnet holder comprising:
   a body having side walls joined by a closed top to define at least a first open end, and an open bottom,
   said top having longitudinal facets formed therein along each side wall, and
   said side walls and facets defining a magnet holder inside height configured and dimensioned in combination with the magnet height and magnet mounting surface such that said closed top engages a magnet with an interference fit along line-to-line contact when secured to an electromechanical machine.

18. The magnet holder of claim 17, further comprising flanges disposed along bottom edges of said sides, said flanges being configured for attachment to the magnet mounting surface.

19. The magnet holder of claim 17, wherein the magnet holder inside height is configured and dimensioned so as to not exceed an elastic deformation limit of the magnet holder in said interference fit.

20. The magnet holder of claim 17, wherein said body is made of a non-magnetic material.

21. A rotor assembly in an electromechanical machine, comprising:
   a rotor having plural magnet mounting surfaces;
   a plurality of magnet holders, one disposed at each magnet mounting surface on the rotor, each magnet holder having an inside top surface spaced from the rotor mounting surface by a predetermined height; and
   a plurality of magnets, one each disposed on a magnet mounting surface within a magnet holder wherein each said magnet has a predetermined height greater than said predetermined height of the magnet holder to form an interference fit along a line-to-line contact with the magnet holder inside top surface when disposed therein.

22. The rotor assembly of claim 21, wherein said magnet holder has a closed top used to contain the magnet, an open bottom providing access to the mounting surface during insertion and removal of magnets, at least one open end for insertion and removal of magnets, and edge flanges parallel to the closed top and open bottom to enable attachment of the holder to the rotor.

23. The rotor assembly of claim 21, wherein adjacent magnet holders are secured to the rotor by clamps.

24. The rotor assembly of claim 21, wherein the magnet holders are secured to the rotor by welding.

25. A rotor assembly in an electromechanical machine, comprising:
   a rotor having plural magnet mounting surfaces;
   a plurality of magnet holders, one disposed at each magnet mounting surface on the rotor, each magnet holder having an inside top surface spaced above the rotor mounting surface by a predetermined height; and
   a plurality of magnets, one each disposed on a magnet mounting surface within a magnet holder wherein each said magnet has a predetermined height greater than said predetermined height of the magnet holder to form an interference fit with the magnet holder along a single line of contact when the magnet is disposed therein;
   wherein each said magnet holder comprises a first side and an opposite second side, each said side having an inwardly directed flange, said flanges defining said inside top surface.

26. The rotor assembly of claim 25, wherein said inwardly directed flanges for each said side of a magnet holder terminate in a spaced apart relationship.

27. The rotor assembly of claim 21, wherein the electromechanical machine is a wind power unit.

28. A method of assembling components of an electromechanical machine, comprising:
   a) assembling a generator/motor unit, including steps of
      providing a stator,
      attaching a magnet holder to a wind-power unit rotor, and
      rotationally attaching the rotor and the stator; and
   b) inserting a magnet into the magnet holder and forming line-to-line contact between the magnet and magnet holder to secure the magnet by interference fit with the magnet holder after said assembling.

29. The method of claim 28, wherein the electromechanical machine is a wind power unit.

30. The method of claim 28, wherein the wind power unit is disposed on a tower and said inserting step (b) is performed on the wind power unit on the tower.

31. The magnet holder of claim 17, wherein said interference fit comprises line-to-line contact between said closed top and the magnet.

32. The magnet holder of claim 31, wherein said longitudinal facets facilitate flexing of the magnet holder to maintain said interference fit.

33. The magnet holder of claim 31, further comprising in combination a permanent magnet, said permanent magnet having a rounded top and being sized in combination with said magnet holder to provide said interference fit with said line-to-line contact.

34. The rotor assembly of claim 21, wherein said magnet holders each comprise a body having side walls joined by a closed top with longitudinal facets formed in said top along each side wall.

35. The method of claim 1, wherein said magnet holder comprises a body having side walls joined by a closed top with longitudinal facets formed in said top along each side wall.

36. The method of claim 28, wherein said magnet holder comprises a body having side walls joined by a closed top with longitudinal facets formed in said top along each side wall.

37. The method of claim 9, wherein said turbine comprises a wind power unit mounted on a tower and said sliding and securing steps are performed on said tower.

38. The method of claim 1, wherein said line-to-line contact is formed between the magnet holder and the magnet in a central part of the top portion of the magnet holder.

39. The magnet holder of claim 17, wherein said magnet holder is configured and dimensioned to engage the magnet with said line-to-line contact in a central part of said closed top.

40. The rotor assembly of claim 21, wherein said line-to-line contact between the magnet and the magnet holder inside top surface is only in a central part of said inside top surface.

41. The method of claim 28, wherein said line-to-line contact is formed between the magnet holder and the magnet in a central part of the top portion of the magnet holder.

* * * * *